United States Patent
Avrahami et al.

(10) Patent No.: US 10,587,652 B2
(45) Date of Patent: Mar. 10, 2020

(54) GENERATING FALSE DATA FOR SUSPICIOUS USERS

(71) Applicant: International Business Machines Corporation, Armonk, NY (US)

(72) Inventors: Shlomit Avrahami, Jerusalem (IL); Yoav Ben-Yair, Mevaseret Zion (IL); Gil Fuchs, Mevaseret Zion (IL); Itai Gordon, Jerusalem (IL); Ilan D. Prager, Beit Shemesh (IL)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 15/825,543

(22) Filed: Nov. 29, 2017

(65) Prior Publication Data
US 2019/0166159 A1   May 30, 2019

(51) Int. Cl.
| | | |
|---|---|---|
| *H04L 29/06* | (2006.01) | |
| *G06N 20/00* | (2019.01) | |
| *G06F 21/55* | (2013.01) | |
| *G06F 21/31* | (2013.01) | |

(52) U.S. Cl.
CPC ........ *H04L 63/1491* (2013.01); *G06F 21/316* (2013.01); *G06F 21/554* (2013.01); *G06N 20/00* (2019.01); *H04L 63/1416* (2013.01); *H04L 63/1483* (2013.01); *H04L 63/105* (2013.01)

(58) Field of Classification Search
CPC .................................................. H04L 63/1491
USPC ......................................................... 726/23
See application file for complete search history.

(56) References Cited

U.S. PATENT DOCUMENTS

| | | |
|---|---|---|
| 7,665,134 B1 | 2/2010 | Hernacki et al. |
| 7,694,339 B2 | 4/2010 | Blake et al. |
| 8,256,006 B2 | 8/2012 | Grzymala-Busse et al. |
| 8,549,643 B1 * | 10/2013 | Shou ............... G06F 21/556 455/410 |
| 9,043,905 B1 | 5/2015 | Allen et al. |
| 9,501,639 B2 | 11/2016 | Stolfo et al. |
| 2009/0328216 A1 | 12/2009 | Rafalovich et al. |

(Continued)

FOREIGN PATENT DOCUMENTS

| | | |
|---|---|---|
| WO | 2008133762 A1 | 11/2008 |
| WO | 2013101723 A1 | 7/2013 |

OTHER PUBLICATIONS

Ben Whitham, "Canary Files: Generating Fake Files to Detect Critical Data Loss from Complex Computer Networks," The Second International Conference on Cyber Security, Cyber Peacefare and Digital Forensic, Malaysia, Mar. 4-6, 2013, pp. 170-179.

(Continued)

*Primary Examiner* — Jacob Lipman
(74) *Attorney, Agent, or Firm* — Winstead PC

(57) ABSTRACT

A method, computer program product and system for generating false data for suspicious users. A suspicious user is identified. Actions of the user are then tracked. The user attempting to access sensitive information is detected. Relevant false sensitive information corresponding to the sensitive information is then detected. The relevant false sensitive information is then mapped to the sensitive information. The relevant false sensitive information is provided to the suspicious user. In response to user input, at least one command is executed, where the at least one command includes the relevant false sensitive information and not the sensitive information.

20 Claims, 6 Drawing Sheets

(56) References Cited

U.S. PATENT DOCUMENTS

2017/0134423 A1* 5/2017 Sysman ............... G06F 21/554
2017/0359376 A1* 12/2017 Evron .................. H04L 63/145

OTHER PUBLICATIONS

Gupta et al., "Luring: A Framework to Induce a Suspected User into Context Honeypot," Second International Workshop on Digital Forensics and Incident Analysis, Aug. 27-28, 2007, pp. 1-3, See Abstract submitted.

* cited by examiner

GENERATING FALSE DATA FOR SUSPICIOUS USERS

BACKGROUND

The present invention relates generally to monitoring the access of sensitive data by users, and more particularly to generating false data for suspicious users.

SUMMARY

In one embodiment of the present invention, a method for generating false data for suspicious users comprises identifying a suspicious user. The method further comprises tracking a plurality of actions of the user. The method additionally comprises detecting that the user attempts to access sensitive information. Furthermore, the method comprises detecting relevant false sensitive information corresponding to the sensitive information. Additionally, the method comprises mapping, by a processor, the relevant false sensitive information to the sensitive information. In addition, the method comprises providing the relevant false sensitive information to the suspicious user. The method further comprises executing, by the processor, at least one command, in response to user input, where the at least one command comprises the relevant false sensitive information and not the sensitive information.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
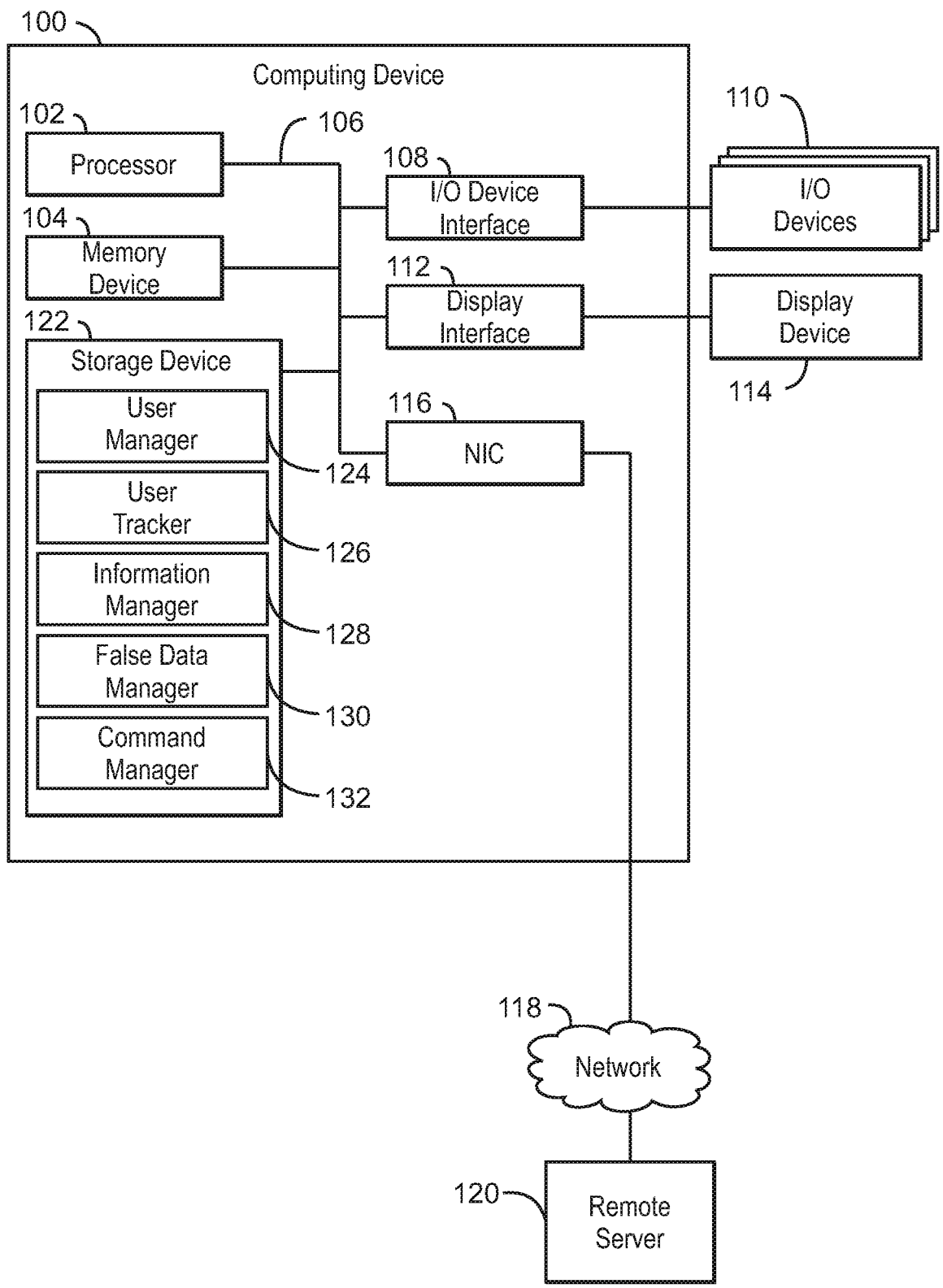
FIG. 1 depicts a block diagram of an example computing system that can generate false data for suspicious users according to an embodiment described herein.

Users frequently transmit data between various devices and remote servers. Additionally, the transmitted data can include confidential or sensitive information such as medical information, financial information, personal information, and the like. In embodiments described herein, devices can generate false data to prevent users suspected of enabling the unauthorized access of confidential information from transmitting sensitive information to others.

In some embodiments described herein, a device can identify a suspicious user. For example, a device can identify users that attempt to transmit sensitive information to unauthorized locations or users. In some examples, a device can also track a plurality of actions of the user. For example, in response to identifying a user as a suspicious user, the device can monitor file accesses, database accesses, data transmissions, and the like. In some embodiments, the device can also detect that the user attempts to access sensitive information. For example, the device can detect that a user queries a database for sensitive information, accesses a local file that includes sensitive information, and the like. In some embodiments, the device can detect relevant false sensitive information corresponding to the sensitive information. For example, the device can generate relevant false sensitive information or detect the relevant false sensitive information from an external source. The relevant false sensitive information, as referred to herein, can include data generated to resemble corresponding sensitive information. For example, relevant false sensitive information can include false or fake sensitive information generated to resemble sensitive information. The relevant false sensitive information can be the same type as the sensitive information in order to appear accurate to a suspicious user. For example, the relevant false sensitive information may include a false list of customer names if the sensitive information includes customer names, a false list of company names if the sensitive information includes company names, and the like.

In some embodiments, the device can map the relevant false sensitive information to the sensitive information. For example, the device can store a link between the relevant false sensitive information and the correct sensitive information to enable the device to perform operations with the relevant false sensitive information. In some examples, the device can provide the relevant false sensitive information to the suspicious user. For example, the device can enable a suspicious user to access a file with relevant false sensitive information or retrieve relevant false sensitive information from a database query. In some embodiments, the device can also execute at least one command, in response to user input, wherein the at least one command includes the relevant false sensitive information and not the sensitive information. For example, the command can include transmitting the relevant false sensitive information to an external source or user, copying the relevant false sensitive information to another file, encrypting the relevant false sensitive information, and the like.

Accordingly, the techniques described herein can prevent unauthorized access of sensitive information by generating and returning relevant false sensitive information to a suspicious user. For example, the techniques described herein can prevent a user from receiving confidential information or a user from performing an unauthorized action with confidential information such as transmitting confidential information to an unauthorized user.

With reference now to FIG. 1, an example computing device is depicted that can generate false data for suspicious users. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote server 120 may connect to the computing device 100 through the network 118.

The processor 102 may also be linked through the system interconnect 106 to a storage device 122 that can include a hard drive, an optical drive, a USB flash drive, an array of drives, or any combinations thereof. In some examples, the storage device 122 may include a user manager 124, user tracker 126, information manager 128, false data manager 130, and command manager 132. In some embodiments, the user manager 124 can identify a suspicious user. The user tracker 126 can track a plurality of actions of the user. In some embodiments, the information manager 128 can detect that the user attempts to access sensitive information. In some embodiments, false data manager 130 can detect relevant false sensitive information corresponding to the sensitive information, map the relevant false sensitive information to the sensitive information, and provide the relevant false sensitive information to the suspicious user. In some embodiments, the command manager 132 can execute at least one command, in response to user input, wherein the at least one command comprises the relevant false sensitive information and not the sensitive information.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the user manager 124, user tracker 126, information manager 128, false data manager 130, and command manager 132 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the user manager 124, user tracker 126, information manager 128, false data manager 130, and command manager 132 can be implemented with logic, wherein the logic, as referred to herein, can include any suitable hardware (e.g., a processor, among others), software (e.g., an application, among others), firmware, or any suitable combination of hardware, software, and firmware.

Figure 2:
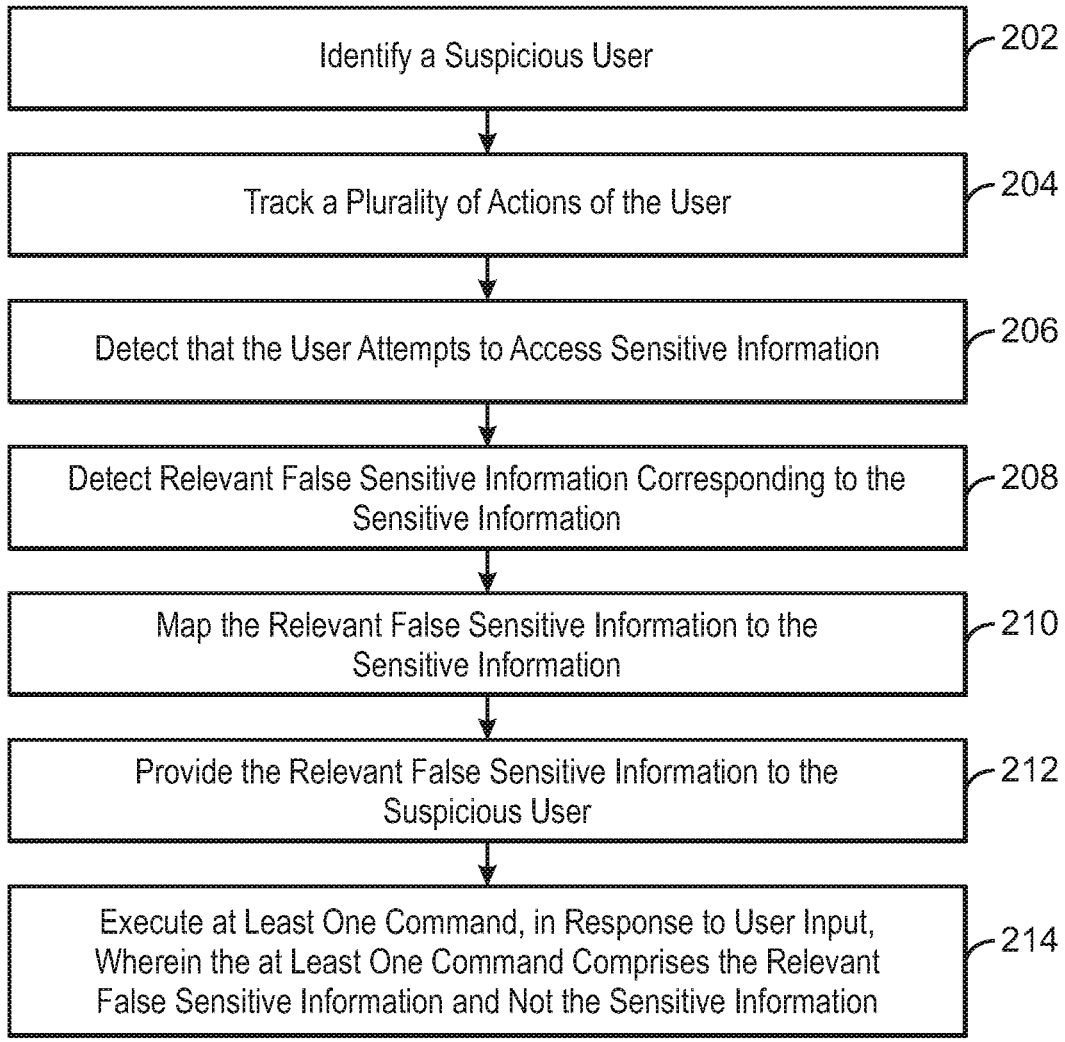
FIG. 2 is a process flow diagram of an example method that can generate false data for suspicious users according to an embodiment described herein.

FIG. 2 is a process flow diagram of an example method that can generate false data for suspicious users. The method 200 can be implemented with any suitable computing device, such as the computing device 100 of FIG. 1.

At block 202, a user manager 124 can identify a suspicious user. In some embodiments, the user manager 124 can detect if a user attempts to access unauthorized data. In some examples, the user manager 124 can detect if a user attempts to transmit sensitive information to an external source or to an unauthorized user. In some examples, the user manager 124 can identify a user as a suspicious user if the user attempts to access sensitive information that the user is not authorized to access. In some embodiments, the user manager 124 can also identify a user as a suspicious user in response to detecting external information about the user such as a termination date of the user from an organization or a date for changing user privileges, and the like.

At block 204, a user tracker 126 can track a plurality of actions of the user. In some embodiments, the user tracker 126 can monitor each user action in response to identifying the user as a suspicious user. In some examples, the user tracker 126 can track the data that a user accesses from a local device, a database, and any other sources. In some embodiments, the user tracker 126 can track each read operation and write operation initiated by a user.

In some examples, the user tracker 126 can monitor transmissions of data from a first user to any number of additional users or devices. In some examples, the data can be transmitted between users and devices with an email, a data packet based on any suitable network protocol, and the like. In some embodiments, the user tracker 126 can detect the transmission of data between users and devices from a web browser, an application installed within a web browser such as a browser add-on, or from a remote external server. For example, the user tracker 126 can reside on a remote server such as a database server, or an email server, among others. In some embodiments, the user tracker 126 can reside in any suitable application and can detect a transmission of data from a first user to a separate set of users in an email, among others.

In some embodiments, the user tracker 126 can hook into event calls or modify an operating system to detect an operation executed by a user. In some examples, the user tracker 126 can monitor, at a kernel level of the operating system, a plurality of system calls involving locally stored data and files. In some embodiments, hooking into an event call can include inserting hooks into a process that enables an application or operating system to intercept functions calls, messages, or events, among others, passed between various software components. For example, hooking into an event call can enable an application or process to intercept keyboard or mouse event messages before the keyboard or mouse messages reach an application. In some embodiments, the user tracker 126 can modify an operating system to load an additional library module or modify the import table of an executable.

At block 206, an information manager 128 can detect that the user attempts to access sensitive information. For example, the information manager 128 can identify user actions that include sensitive information or non-sensitive information. In some embodiments, the sensitive information can include any financial data, personal identification data, or any other data a user is unauthorized to access. In some examples, non-sensitive information can include any data not identified as sensitive information. In some embodiments, the information manager 128 can determine if a user can access sensitive information based on an authorization level of a user. In some embodiments, suspicious users are allowed to access, modify, and transmit non-sensitive information without a generation of relevant false sensitive information as discussed below in relation to block 208.

At block 208, a false data manager 130 can detect relevant false sensitive information corresponding to the sensitive information. In some embodiments, the false data manager 130 can generate relevant false sensitive information on a local device or retrieve relevant false sensitive information from an external source. For example, the false data manager 130 can use any suitable machine learning technique to generate relevant false information that corresponds to sensitive information. In some examples, the relevant false information can include any suitable similar type of information. For example, the relevant false information can include a company name if the sensitive information pertains to company names, the relevant false information can include a customer name if the sensitive information pertains to customer names, company information such as employee salaries, personal information such as mailing addresses, government identifiers, and the like.

In some embodiments, the false data manager 130 can detect that relevant false sensitive information is added to a file, and add a watermark indicator to metadata of the file. The watermark, as referred to herein, can include an indicator stored in metadata of a file, or data stored in a file itself that indicates a presence of relevant false sensitive information. In some examples, the false data manager 130 can transmit the watermark indicator and the relevant false sensitive information to an external database. In some embodiments, the external database can generate the relevant false sensitive information in response to a query from the suspicious user.

At block 210, the false data manager 130 can map the relevant false sensitive information to the sensitive information. In some examples, the false data manger 130 can generate a locally stored file to store the mapping of the relevant false information to the sensitive information. In some embodiments, the false data manger 130 can transmit the locally stored file to a database manager that can generate and maintain a new table with the mapping information. In some embodiments, the mapping can be stored in any suitable data structure such as a linked list, array, vector, and the like. In some examples, the false data manager 130 can detect a format of sensitive information such as a nine digit government identifier and generate false nine digit government identifiers. In some embodiments, the relevant false sensitive information and the mapping to the sensitive information can be stored in an encrypted format based on a hashmap. In one example, the mapping can include a first pointer to a memory address that stores the sensitive information and a second pointer to a memory address that stores the relevant false sensitive information. The mapping can enable subsequent commands to retrieve and present the relevant false information to a suspicious user. In some embodiments, the false data manager 130 can instruct an external database to create a new table including the mapping of the sensitive information to the relevant false sensitive information and a watermark indicator. In some embodiments, the false data manager 130 can detect a plurality of suspicious users and instruct the database to create a new table for each suspicious user. In some examples, each new table can include a separate mapping of the sensitive information to separate relevant false sensitive information and a separate watermark indicator for each suspicious user. Accordingly, separate sets of relevant false sensitive information can be generated for each suspicious user, which is mapped separately. In some embodiments, the relevant false sensitive information can be tracked through various external locations and users to determine which suspicious user is transmitting relevant false sensitive information to particular external sources or users.

At block 212, the false data manager 130 can provide the relevant false sensitive information to the suspicious user. For example, the false data manager 130 can return relevant false sensitive information as a result of executing a command as discussed below in relation to block 214.

At block 214, a command manager 132 can execute at least one command, in response to user input, wherein the at least one command comprises the relevant false sensitive information and not the sensitive information. In some embodiments, the command manager 132 can execute read commands, write commands, and the like, with the relevant false sensitive information. For example, the command manager 132 can transmit the relevant false sensitive information to external sources or users unauthorized to view the corresponding sensitive information. The command manager 132 can also store the relevant false sensitive information in newly created files, copy the relevant false sensitive information to existing files, encrypt the relevant false sensitive information, and the like.

In some examples, the command manager 132 can redact portions of the relevant false sensitive information in response to a command to transmit the relevant false sensitive information to an external source. The redaction can be based on comparable redactions to the corresponding sensitive information. The redaction can result in relevant false sensitive information that is redacted, which can indicate to a suspicious user that the relevant false sensitive information is accurate. In some embodiments, the command manager 132 can block any transmission of the relevant false sensitive information to an external source. The blocked transmission can also indicate to a suspicious user that the relevant sensitive information is accurate.

In some embodiments, the command manager 132 can determine whether to block a transmission of relevant false sensitive information, redact the relevant false sensitive information, or allow the relevant sensitive information to be transmitted based on characteristics associated with the user transmitting the relevant false sensitive information. For example, the characteristics can indicate whether a user has permission to access the corresponding sensitive information from a particular local device or remote device that hosts the sensitive information, the file name corresponding to the sensitive information on the host device, a creation date of the sensitive information on the host device, a user or group of users with administrative access to the sensitive information on the host device, and the like.

The process flow diagram of FIG. 2 is not intended to indicate that the operations of the method 200 are to be executed in any particular order, or that all of the operations of the method 200 are to be included in every case. For example, the method 200 can include generating an alert and transmitting the alert to a predetermined user in response to detecting a transmission of the relevant false sensitive information to an external source, or detecting that false sensitive information has been stored in an encrypted format.

Figure 3:
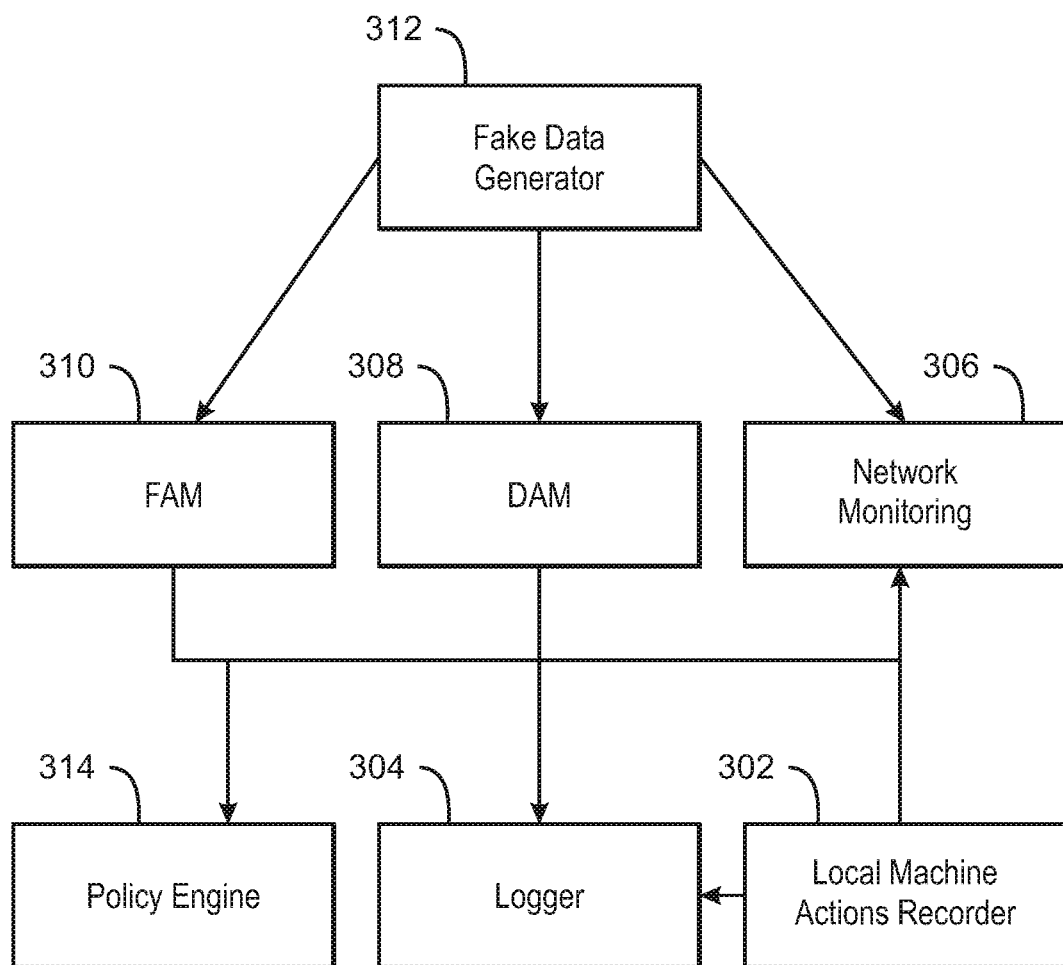
FIG. 3 illustrates example components for managing relevant false sensitive information.

FIG. 3 illustrates example components for managing relevant false sensitive information. In some embodiments, the system 300 can be implemented with any suitable computing device such as the computing device 100 of FIG. 1.

In some embodiments, a local machine actions recorder 302 can detect operations executed by a user. In some examples, operations can be flagged as suspicious. For example, operations can be flagged as suspicious if the operations include copying sensitive information to an external storage device connected to a local device, sending sensitive information to an external email server, zipping sensitive information and sending the zipped sensitive information to an external location, or based on an administrator action if operations are executed by a user approaching a termination date from an organization, among others.

In some embodiments, the local machine actions recorder 302 can transmit executed operations for each user to a logger 304. The logger 304 can store each executed operation for each user. The local machine actions recorder 302 and the logger 304 can enable data lineage to be tracked so that the system 300 can determine when relevant false sensitive information was generated and whether actions are being performed with sensitive information or relevant false sensitive information.

In some embodiments, a network monitor 306 can detect data transmitted from the local machine actions recorder 302. For example, data transmitted by a user to an external source, such as an email server, or the like, can be monitored. In some embodiments, a database activity manager (DAM) 308 can also monitor executed commands by the local machine actions recorder 302 that involve a database. For example, DAM 308 can monitor database queries that include retrieving sensitive information from a database. In some embodiments, a file activity manager (FAM) 310 can also monitor the local machine actions recorder 302 to detect files accessed with sensitive information, zip files created with sensitive information, and the like. In some embodiments, the network monitor 306, DAM 308, and FAM 310 can each communicate with a fake data generator 312 that can generate relevant false sensitive information corresponding to sensitive information associated with executed commands. For example, the fake data generator 312 can detect a type of data included in the sensitive information. In some embodiments, the fake data generator 312 can generate relevant false sensitive information such as customer names, company names, product names, birth dates, financial information, and the like, to match corresponding sensitive information. Accordingly, the relevant false sensitive information appears to a suspicious user to be legitimate and accurate sensitive information.

In some examples, the fake data generator 312 can generate a masked file in response to identifying a suspicious user accessing a file or creating a new file via the FAM 310. In some examples, the fake data generator 312 can generate masked query results in response to a suspicious user executing a query from a database via the DAM 308. In some embodiments, the fake data generator 312 can generate masked results in response to a suspicious user sending non-masked content detected by the network monitor 306. In some examples, the fake data generator 312 transmits relevant false sensitive information to the network monitor 306, DAM 308, and FAM 310. Alternatively, the network monitor 306, DAM 308, and FAM 310 can transmit newly generated relevant false sensitive information to each other. For example, the FAM 310 can detect relevant false sensitive information stored in a local file and transmit the relevant false sensitive information to the DAM 308 so that any database query provides results consistent with the relevant false sensitive information.

In some embodiments, a policy engine 314 can determine a response for each action by a suspicious user. For example, the network monitor 306, DAM 308, and FAM 310 can detect an action by a suspicious user and transmit the action to a policy engine 314. In some embodiments, the policy engine 314 can implement policies such as redacting or blocking a transfer of files that include a watermark indicating a presence of relevant false sensitive information, allowing a transmission of files with a watermark to unauthorized external locations or users, and the like. In some examples, the policy engine 314 can detect if a file is watermarked and contains relevant false sensitive information, and allow the watermarked file to be transmitted by email to an external location. In some examples, the policy engine 314 can detect if relevant false sensitive information is sent to an external email account or server and the policy engine 314 can redact the sensitive information. In some embodiments, the policy engine 314 can prevent a user from changing a file type of a file retrieved with relevant false sensitive information, or prevent predetermined applications from accessing the file retrieved with relevant false sensitive information. For example, the policy engine 314 can prevent changing a document from a portable document format to a word processing format if the document includes relevant false sensitive information. The policy engine 314 can return results to the network monitor 306, DAM 308, or FAM 310 to use in executing a command from a suspicious user.

It is to be understood that the block diagram of FIG. 3 is not intended to indicate that the system 300 is to include all of the components shown in FIG. 3. Rather, the system 300 can include fewer or additional components not illustrated in FIG. 3 (e.g., additional memory components, embedded controllers, modules, additional network interfaces, etc.). In some embodiments, the local machine actions recorder 302, logger 304, network monitor 306, DAM 308, FAM 310, fake data generator 312, and policy engine 314 can reside in a single device. Alternatively, the local machine actions recorder 302, logger 304, network monitor 306, DAM 308, FAM 310, fake data generator 312, and policy engine 314 can reside in any number of separate devices or may be accessible as a remote service hosted by any number of external servers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
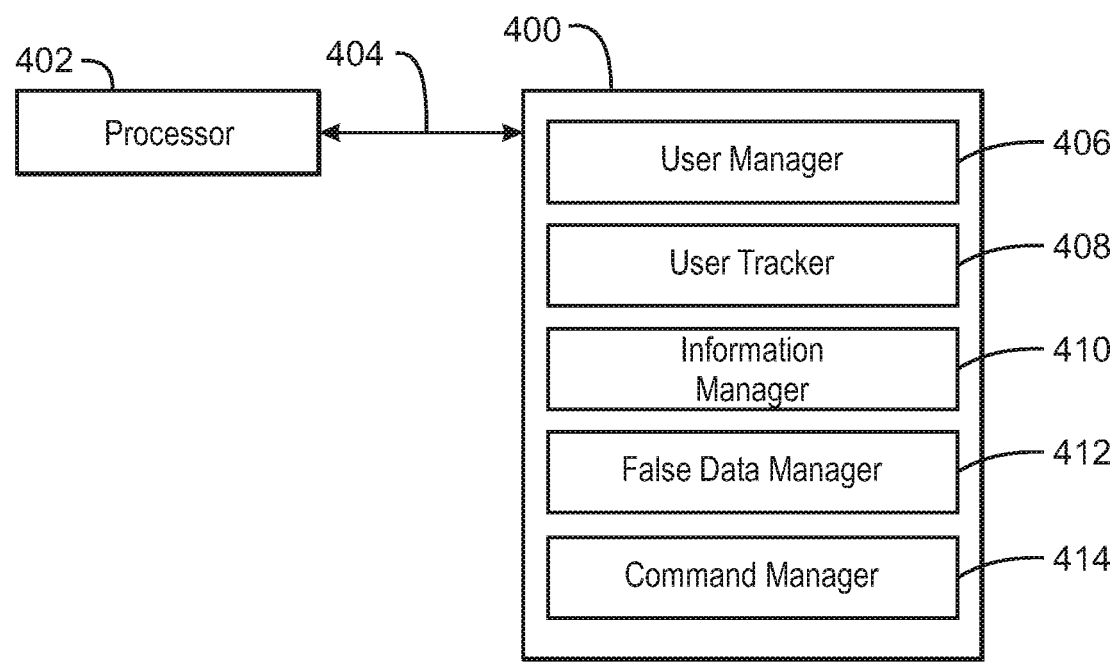
FIG. 4 is a tangible, non-transitory computer-readable medium that can generate false data for suspicious users according to an embodiment described herein.

Referring now to FIG. 4, a block diagram is depicted of an example of a tangible, non-transitory computer-readable medium that can generate false data for suspicious users. The tangible, non-transitory, computer-readable medium 400 may be accessed by a processor 402 over a computer interconnect 404.

Furthermore, the tangible, non-transitory, computer-readable medium 400 may include code to direct the processor 402 to perform the operations of the current method. For example, user manager 406 can identify a suspicious user. The user tracker 408 can track a plurality of actions of the user. In some embodiments, the information manager 410 can detect that the user attempts to access sensitive information. In some embodiments, false data manager 412 can detect relevant false sensitive information corresponding to the sensitive information, map the relevant false sensitive information to the sensitive information, and provide the relevant false sensitive information to the suspicious user. In some embodiments, the command manager 414 can execute at least one command, in response to user input, wherein the at least one command comprises the relevant false sensitive information and not the sensitive information.

It is to be understood that any number of additional software components not shown in FIG. 4 may be included within the tangible, non-transitory, computer-readable medium 400, depending on the specific application. Furthermore, fewer software components than those shown in FIG. 4 can be included in the tangible, non-transitory, computer-readable medium 400.

Figure 5:
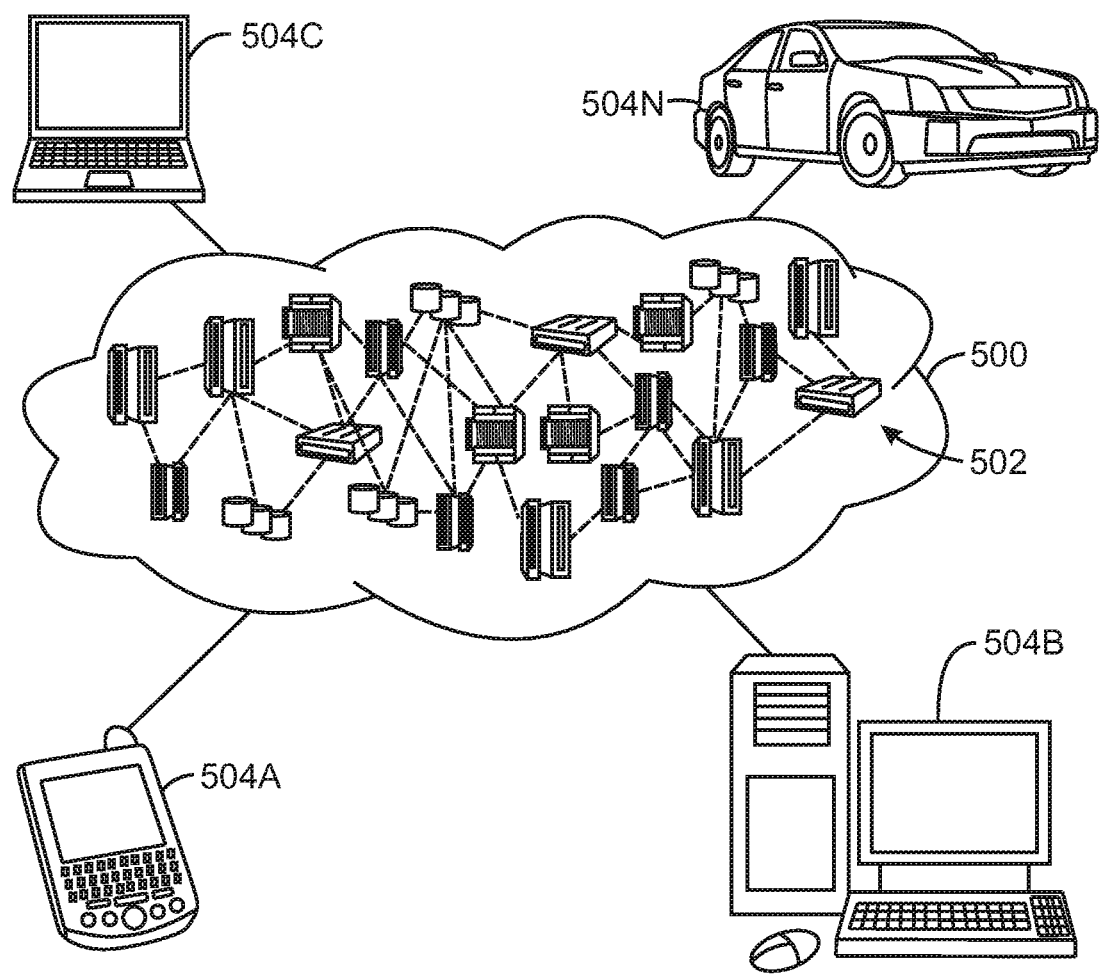
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
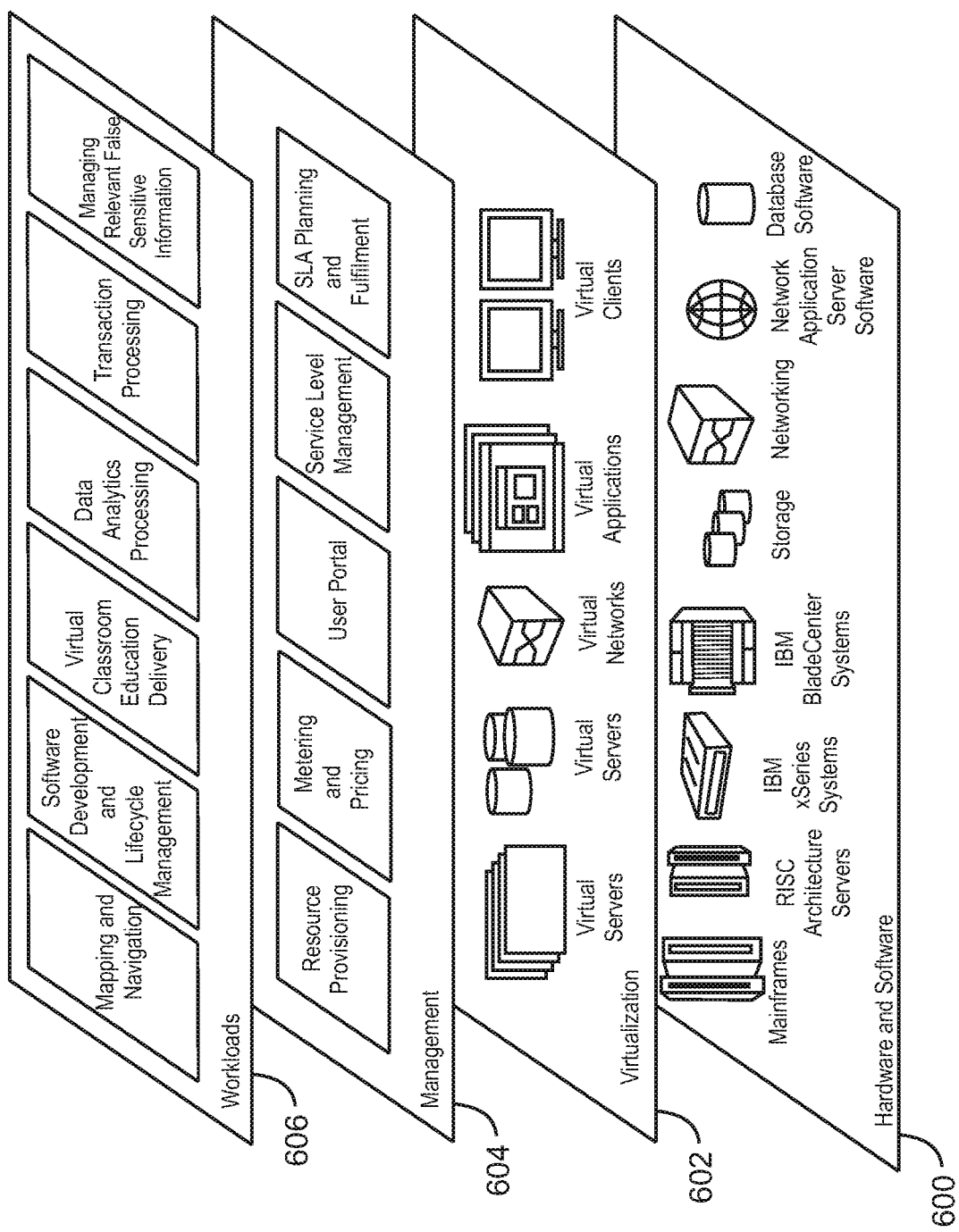
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and generating false data for suspected malicious users.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for generating false data for suspicious users, the method comprising:
   identifying a suspicious user;
   tracking a plurality of actions of the user;
   detecting that the user attempts to access sensitive information;
   detecting relevant false sensitive information corresponding to the sensitive information;
   mapping, by a processor, the relevant false sensitive information to the sensitive information;
   providing the relevant false sensitive information to the suspicious user;
   executing, by the processor, at least one command, in response to user input, wherein the at least one command comprises the relevant false sensitive information and not the sensitive information, wherein the at least one command comprises one of the following: a read command and a write command; and
   determining whether to block a transmission of the relevant false sensitive information, redact the relevant false sensitive information or allow the relevant false sensitive information to be transmitted based on characteristics associated with the user, wherein the characteristics indicate whether a user has permission to access the corresponding sensitive information from a particular local device or remote device that hosts the sensitive information, a file name corresponding to the sensitive information on the host device, a creation date of the sensitive information on the host device, and administrative access to the sensitive information on the host device.

2. The method as recited in claim 1 further comprising:
blocking the transmission of the relevant false sensitive information to an external source.

3. The method as recited in claim 1 further comprising:
redacting the relevant false sensitive information in a transmission to an external source.

4. The method as recited in claim 1 further comprising:
allowing transmission of the relevant false sensitive information to an external source in response to detecting that the relevant false sensitive information does not include the sensitive information.

5. The method as recited in claim 1 further comprising:
detecting the relevant false sensitive information corresponding to the sensitive information from an external database.

6. The method as recited in claim 1 further comprising:
generating the relevant false sensitive information with a machine learning technique.

7. The method as recited in claim 1, wherein the at least one command comprises encrypting the relevant false sensitive information, transmitting the relevant false sensitive information to an external storage device, copying the relevant false sensitive information to a separate location in local storage, or any combination thereof.

8. A computer program product for generating false data for suspicious users, the computer program product comprising a computer readable storage medium having program code embodied therewith, the program code comprising the programming instructions for:
identifying a suspicious user;
tracking a plurality of actions of the user;
detecting that the user attempts to access sensitive information;
detecting relevant false sensitive information corresponding to the sensitive information;
mapping the relevant false sensitive information to the sensitive information;
providing the relevant false sensitive information to the suspicious user;
executing at least one command, in response to user input, wherein the at least one command comprises the relevant false sensitive information and not the sensitive information, wherein the at least one command comprises one of the following: a read command and a write command; and
determining whether to block a transmission of the relevant false sensitive information, redact the relevant false sensitive information or allow the relevant false sensitive information to be transmitted based on characteristics associated with the user, wherein the characteristics indicate whether a user has permission to access the corresponding sensitive information from a particular local device or remote device that hosts the sensitive information, a file name corresponding to the sensitive information on the host device, a creation date of the sensitive information on the host device, and administrative access to the sensitive information on the host device.

9. The computer program product as recited in claim 8, wherein the program code further comprises the programming instructions for:
blocking the transmission of the relevant false sensitive information to an external source.

10. The computer program product as recited in claim 8, wherein the program code further comprises the programming instructions for:
redacting the relevant false sensitive information in a transmission to an external source.

11. The computer program product as recited in claim 8, wherein the program code further comprises the programming instructions for:
allowing transmission of the relevant false sensitive information to an external source in response to detecting that the relevant false sensitive information does not include the sensitive information.

12. The computer program product as recited in claim 8, wherein the program code further comprises the programming instructions for:
detecting the relevant false sensitive information corresponding to the sensitive information from an external database.

13. The computer program product as recited in claim 8, wherein the program code further comprises the programming instructions for:
generating the relevant false sensitive information with a machine learning technique.

14. The computer program product as recited in claim 8, wherein the at least one command comprises encrypting the relevant false sensitive information, transmitting the relevant false sensitive information to an external storage device, copying the relevant false sensitive information to a separate location in local storage, or any combination thereof.

15. A system, comprising:
a memory unit for storing a computer program for generating false data for suspicious users; and
a processor coupled to the memory unit, wherein the processor is configured to execute the program instructions of the computer program comprising:
identifying a suspicious user;
tracking a plurality of actions of the user;
detecting that the user attempts to access sensitive information;
detecting relevant false sensitive information corresponding to the sensitive information;
mapping the relevant false sensitive information to the sensitive information;
providing the relevant false sensitive information to the suspicious user;
executing at least one command, in response to user input, wherein the at least one command comprises the relevant false sensitive information and not the sensitive information, wherein the at least one command comprises one of the following: a read command and a write command; and
determining whether to block a transmission of the relevant false sensitive information, redact the relevant false sensitive information or allow the relevant false sensitive information to be transmitted based on characteristics associated with the user, wherein the characteristics indicate whether a user has permission to access the corresponding sensitive information from a particular local device or remote device that hosts the sensitive information, a file name corresponding to the sensitive information on the host device, a creation date of the sensitive information on the host device, and administrative access to the sensitive information on the host device.

16. The system as recited in claim 15, wherein the program instructions of the computer program further comprise:

blocking the transmission of the relevant false sensitive information to an external source.

17. The system as recited in claim 15, wherein the program instructions of the computer program further comprise:

redacting the relevant false sensitive information in a transmission to an external source.

18. The system as recited in claim 15, wherein the program instructions of the computer program further comprise:

allowing transmission of the relevant false sensitive information to an external source in response to detecting that the relevant false sensitive information does not include the sensitive information.

19. The system as recited in claim 15, wherein the program instructions of the computer program further comprise:

detecting the relevant false sensitive information corresponding to the sensitive information from an external database.

20. The system as recited in claim 15, wherein the program instructions of the computer program further comprise:

generating the relevant false sensitive information with a machine learning technique.

* * * * *